Figure 7:
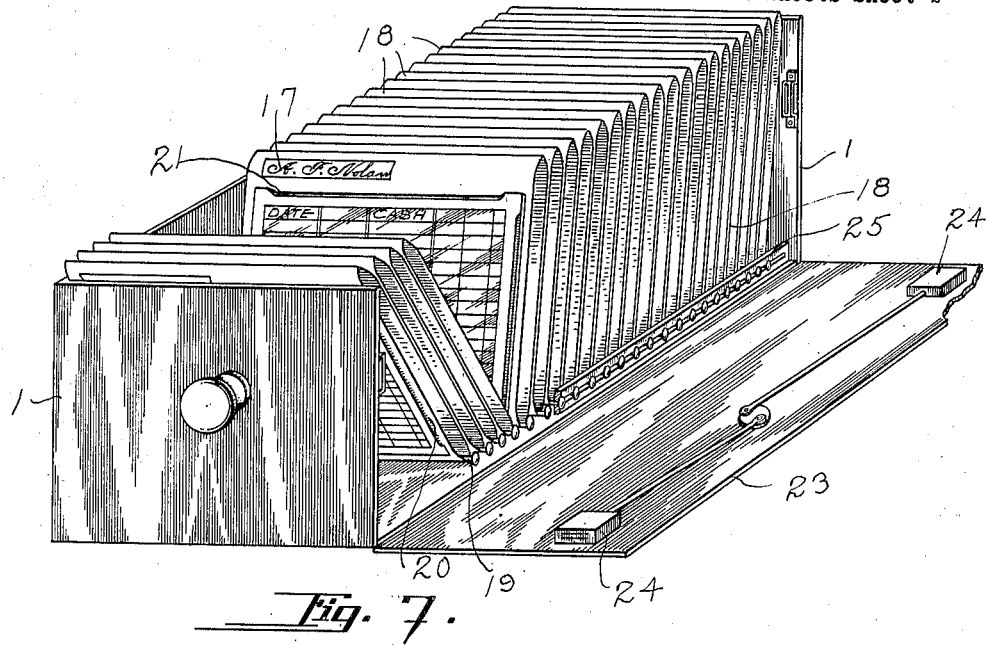

Jan. 4, 1927.  
F. M. SHOTWELL  
1,613,570  
PROTECTED INDEX FILE UNIT  
Filed Nov. 10, 1924  
2 Sheets-Sheet 1
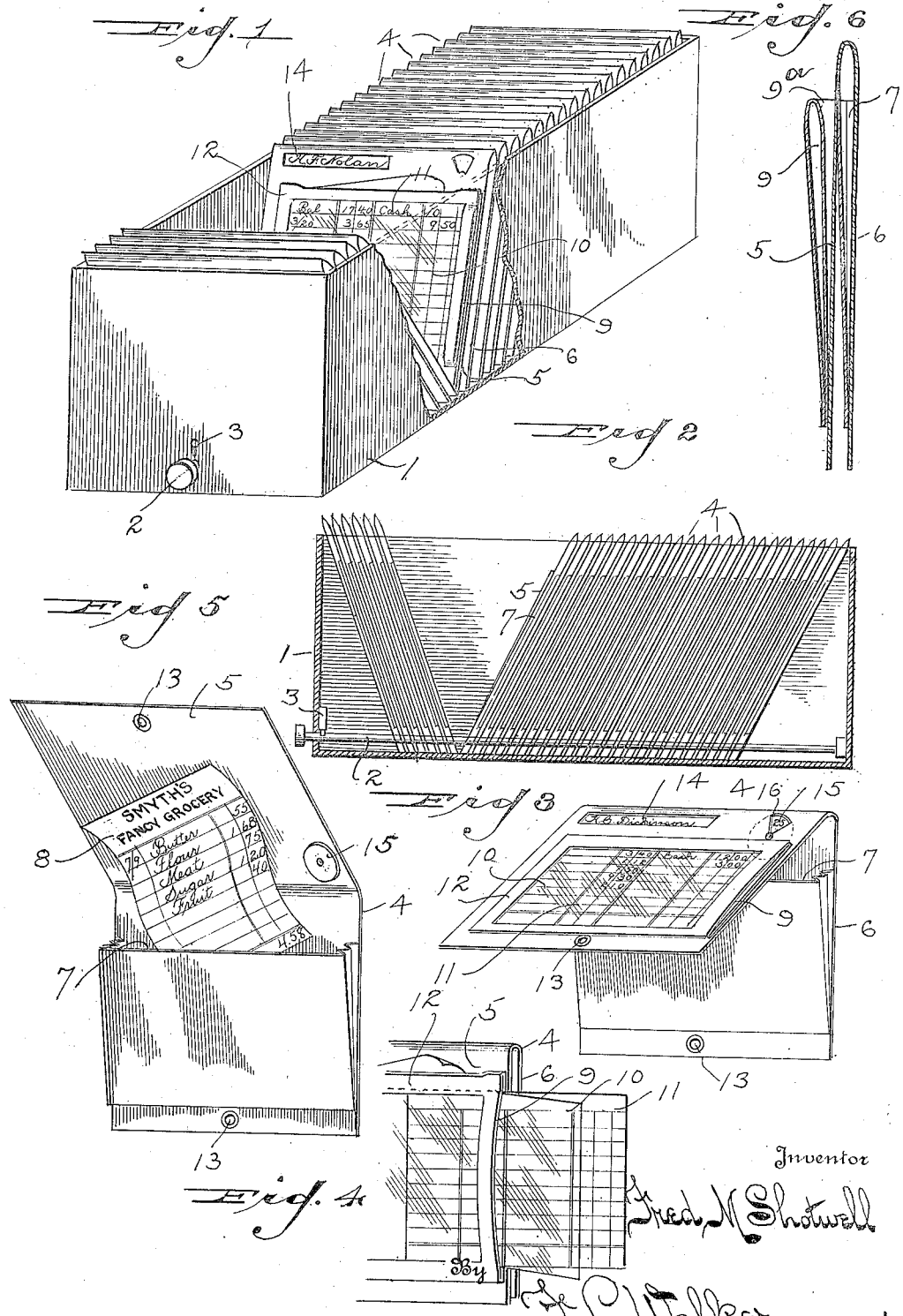

Jan. 4, 1927.

F. M. SHOTWELL 1,613,570

PROTECTED INDEX FILE UNIT

Filed Nov. 10, 1924    2 Sheets-Sheet 2

Inventor
Fred M. Shotwell
By F. L. Walker
Attorney

Patented Jan. 4, 1927.

1,613,570

UNITED STATES PATENT OFFICE.

FRED M. SHOTWELL, OF DETROIT, MICHIGAN, ASSIGNOR, BY DIRECT AND MESNE ASSIGNMENTS, TO JOHN Q. SHERMAN, OF DAYTON, OHIO.

PROTECTED-INDEX-FILE UNIT.

Application filed November 10, 1924. Serial No. 748,949.

My invention relates to filing systems and more particularly to a protected file system for records of account, sales slips, accounting memoranda and the like.

While the filing devices herein disclosed are particularly applicable to a retail mercantile business for containing the ledger accounts of customers, the filing device is also applicable to other lines of accounting, as for instance, a physician's accounting system, or it may be employed for filing and keeping a detailed record of stock requisitions in a factory, signature cards in a bank, bank records of deposits, or as a classified file of general information.

In the present invention there is contemplated a collection of file units each having therein three pockets, one of which is normally accessible for insertion of current sales slips or memoranda, the other two being normally inaccessible, one of the latter having a transparent face thru which is exposed a detail sheet such as a stock record, a ledger card or index card upon which may be summarized the data from the current slips, and the other normally inaccessible pocket is adapted to contain the accumulation of slips or memoranda transferred from the normally accessible pocket after their notation upon the visible record sheet or index card. The collection of units is arranged in a file box or receptacle for to and fro oscillatory movement by which the record sheet or ledger card of any unit may be exposed to view thru its transparent cover, and the pocket for current slips made accessible for deposit of slips, but the accumulation of transferred slips contained in the remaining pocket and the record sheet or ledger card are inaccessible for removal or tampering by unauthorized persons. The clerk or attendant is thus enabled to file current memoranda and sales slips in the open pocket and to ascertain the condition of the account or recorded summary from the ledger sheet or detail record card, but cannot remove such card or change the entries thereon nor remove or mutilate the previously transferred memoranda or sales slips contained in the normally inaccessible pocket and upon which the summarized record is based.

To this end the unit is preferably made in the form of a folder having upon its front, the normally accessible pocket to temporarily receive the daily or current records and memoranda slips and a laterally opening transparent pocket for the ledger card or record sheet, while upon the interior of the folder is the pocket to which the slips or memoranda sheets are transferred from time to time. The folders are mounted in the receptacle or box for to and fro movement either by being hinged at their lower margins or by being transfixed by a retainer rod locked in position in the receptacle or box. Obviously, so long as the unit is held against removal from the filing compartment or box, by the engagement of both of its flaps or sides with the receptacle or container, the ledger card or record sheet cannot be withdrawn thru the obstructed access opening of the transparent pocket which is closed in this instance, by the side wall of the filing compartment. The sales slips cannot be removed from the internal pocket of the folder, due to the closure of the intervening space between the front and rear flaps of the unit by the side wall of the filing compartment. The temporary file pocket on the front of the unit is, however, always accessible.

The object of the invention is to simplify the structure as well as the means and mode of operation of protected account files, and the like, whereby they will not only be cheapened in construction, but will be efficient in use, capable of being easily and quickly manipulated to disclose any desired accounts or record sheets, yet affording protection against the removal or alteration of such record sheets and to afford ample protection for the memoranda or data from which the ledger card or record sheet is compiled.

A further object of the invention is to provide in such an account file, a simple form of "flagging" changeable from time to time to indicate the condition of a particular account, the credit limit of the customer, or other useful information or data.

With the above primary and other incidental objects in view as will more fully appear in the specification, the invention consists of the features of construction, the parts and combinations thereof, and the mode of operation or their equivalents as hereinafter described and set forth in the claims.

Figure 8:
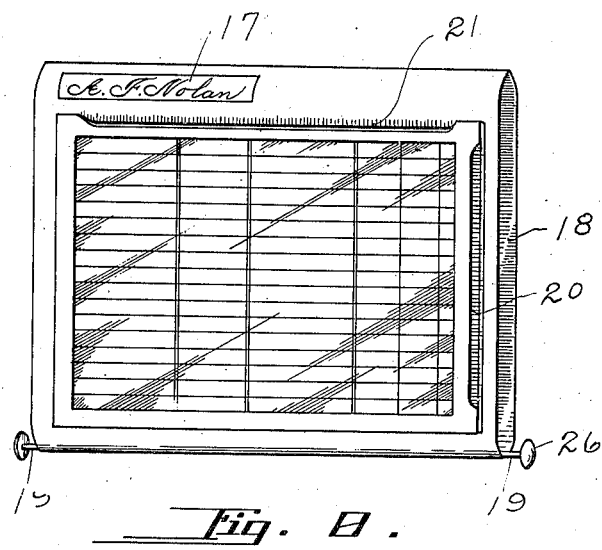

In the accompanying drawing, wherein is shown the preferred, but obviously not necessarily the only embodiment of the invention, Fig. 1 is a perspective view of a file box or container, in which is located a series of the file units herein described, the front of the box being partially broken away to illustrate its relation with the access opening of the unit. Fig. 2 is a longitudinal sectional view of a file device embodying the present invention. Fig. 3 is a perspective view of one of the file units, removed from the compartment or box. Fig. 4 is a further perspective view of of one of the file units, illustrating the removable transparent face or overlay, and the ledger card or record sheet. Fig. 5 is a further perspective view of a file unit in open or distended position, showing the interior pocket for memoranda slips and also the adjustable flagging or indicator device. Fig. 6 is a detail sectional view of the file unit. Fig. 7 is a perspective view of a modification of the file in which the units are individually hinged in the receptacle. Fig. 8 is a detail perspective view of the hinged unit.

Like parts are indicated by similar characters of reference throughout the several views.

Referring to Figs. 1 to 6 of the drawings, 1 is the file box or compartment, having the usual longitudinally disposed retainer rod 2, such as is ordinarily employed in a card index file to retain the cards in their position and prevent removal. In the present instance, the retainer rod 2 is preferably locked against withdrawal and release of the file members by means of a lock 3, which may be of any suitable design or form. The file units 4 in the present instance, are in the form of folders, comprising front and rear flaps, hinged one to the other, at their top margin. Upon the inside of the folder unit 4, there is provided a pocket 7, to receive sales slips or memoranda sheets 8. This pocket 7 opens upwardly, having its mouth in close proximity to the hinged margins of the flaps 5 and 6. Furthermore, while the pocket 7 opens upwardly, toward the interconnected margins of the respective flaps 5 and 6, it may be arranged to open laterally in either direction, similar to the exterior ledger card or record sheet pocket to be described.

Upon the exterior face of the forward flap 5 of the file unit, there are provided two pockets. A pocket 9 opens, preferably along the vertical side margin of the unit flap, but might have its access opening along its lower margin. A second pocket 9ª opens upward between the pocket 9 and the flap 5. The pocket 9 is provided with a transparent front wall or overlay 10, through which the ledger card, index or record sheet within the pocket, may be observed and read. The transparent pocket wall or overlay 10 may be permanently attached, or said pocket 9 may be in the form of a frame 12 attached to the unit and having the enlarged opening or window. In such case, the transparent face or overlay 10 is slipped loosely into the pocket defined by the marginal frame or binding 12, and superposed upon the ledger card or record sheet 11 contained within the pocket. In Fig. 4 the transparent overlay and ledger card are shown partially withdrawn from the pocket 9. The pocket 9ª which serves as a temporary depository for the sales slips is located immediately behind the pocket 9 but has its mouth upturned and always accessible.

The free marginal edges of the file unit flaps 5 and 6 are provided with holes 13, preferably reinforced by eyelets or other binding or reinforcing means. These free perforated edges are preferably tho not necessarily turned downward in the file box or receptacle.

The retaining rod 2 extends transversely thru the holes 13 in both the forward and rearward flaps 5 and 6 of each unit. The side walls of the file compartment or box 1 extend approximately to the top or folded edge of the file unit and the file units are of such size as to approximately fit transversely within the compartment. Thus the side wall of the box or compartment affords a complete closure for the lateral pocket 9. In the event the pocket 9 is open on its lower margin such access opening is closed by the bottom of the box. The box wall also closes the intervening space between the front and rear flap 5 and 6 at opposite sides of the unit. The unit being locked within the compartment or box by being transfixed by the rod 2, cannot be removed therefrom, except by someone authorized to do so, and possessing the key to the lock 3. Without removal from the compartment or box, the ledger card or record sheet 11 cannot be withdrawn from the pocket 9, and furthermore, the interior pocket 7 is not accessible for either the deposit or removal of memoranda slips or sales slips 8. Nevertheless the file units may be oscillated to and fro to expose to view the ledger cards or record sheet 11, of any selected unit upon which the entries may be read thru the transparent overlay 10. By such arrangement a clerk may readily ascertain the condition of a customer's account, an amount due or other detailed information, appearing upon the ledger card or record sheet 11, but he cannot remove such card or sheet or make alterations thereon, neither can he have access to the depository 7 for sales slips, or memoranda upon which the ledger card entries are based. Thus if inclined to be dishonest he cannot change the entries upon the ledger card, and remove any portion of the sales slips. Each file unit bears adjacent to its top margin, the name of the customer, as shown at 14. This may be applied directly to the file unit, or it may be applied by means of an interchangeable label to be secured to the unit in any suitable or desired manner. There is also shown upon the file unit, a flagging device or indicator, comprising a disc 15, pivoted upon the interior top of the front flap 5. The flap 5 is provided with an observation opening 6, thru which different portions of the disc 15 may be exposed by rotation of the disc. The disc 15 may have entered thereon, different monetary amounts representing the different limits of credit to which a particular customer may be entitled. These amounts may be successively displayed in accordance with the credit allowed to a particular customer by the rotation of the disc 15. Likewise, different portions of the disc 15, may be differently colored and by rotation of the disc, such indicating color may be displayed thru the opening 16, thereby showing whether the account is overdue, good pay, poor pay, overdrawn, etc. It is obvious that records contained within the file are fully protected against abstraction or change, yet the necessary information and data is instantly available for observation, but can be removed or the entries changed only by an authorized person.

Provision is made at 14 for displaying the name of the customer or other title pertaining to the filed data. Such provision preferably, though not necessarily, consists of an opening near the top of the forward flap 5 to receive a label or tag removably secured to the unit. Such identification labels or tags are preferably differently located transversely on different units, so that such units may be arranged with the labels or tags in staggered relation or echelon. In Figs. 7 and 8 there is shown a modification of the construction heretofore described, in which in lieu of the retainer rod 2 common to all of the file units as before described, each file unit is independently hinged in the receptacle or box, the latter being provided with a removable side, by which access may be had to the otherwise inaccessible pockets.

In this modified construction, the units instead of being folded and having free marginal edges may be made in the form of envelopes as shown at 18 in Fig. 8. Such envelope is positioned in the receptacle or file box 1, with its mouth or access opening at its end or one vertical margin. Such envelopes are provided with trunnions or hinge rods 19 embedded or otherwise incorporated in the file envelope along its lower closed margin. The ends of the trunnion rod 19 are provided with bearings in the box or receptacle, enabling the unit to be oscillated to and fro.

On the forward face of the envelope 18 are provided two pockets 20 and 21, corresponding to the pockets 9 and 9ᵉ previously described. The pocket 20 opens laterally to receive the record sheet or ledger card, and is provided with a transparent face thru which such inserted record or ledger card may be observed. Intermediate the pocket 20 and the envelope 18 is found the second pocket 21, opening upwardly to temporarily receive the cards. The side wall of the box or receptacle overlapping the open ends of the pockets 18 and 20 is hinged or otherwise removable to afford access to the file unit. Such movable side 23 is provided with a lock 24 by which it may be secured in its closed position. While the trunnion rods 19 may each be provided with a separate bearing in the box or receptacle, such trunnion rods are preferably engaged in a slotted bearing bar 25, adjacent to the bottom of the receptacle or box, thereby enabling the unit to be slidingly adjusted to accommodate units of increasing bulk as the sales slips or data sheets accumulate. To prevent disengagement of the trunnion rods from such bearing rail 25 the rods may be provided with heads 26.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein described comprises the preferred form of several modes of putting the invention into effect, and the invention is, therefore, claimed in any of its forms or modifications within the legitimate and valid scope of the appended claims.

Having thus described my invention, I claim:

1. In a protected file, an open pocket receptacle, a plurality of file units therein, each file unit having therein a pocket to receive data slips, the mouth of the pocket being turned to a position contiguous to a wall of the receptacle normally inaccessible for the insertion or removal of data slips without removing the unit from the receptacle, and retaining means for releasably confining the units to the receptacle while permitting access thereto for manual to and fro movement of the same therein.

2. In a protected file, an open top receptacle for a plurality of file units, file units therein, each comprising a pocket member to receive data slips, a cover flap normally closing the mouth of the pocket to prevent the removal or insertion of data slips, means for releasably confining the units to the receptacle with such closure flaps in closed position while permitting access thereto for manual to and fro movement of the unit within the receptacle to expose adjacent units to view.

3. In a protected file, an open top receptacle to contain a plurality of units, a plurality of file pockets contained therein and adapted to receive data slips, the mouths of such pockets being normally inaccessibly positioned to prevent the insertion or removal of data slips, and means for confining the file pockets to the receptacle with their mouths inaccessibly positioned while permitting access thereto for manual to and fro oscillation of the file pockets within the receptacle to expose adjacent file pockets to view.

4. In a protected file, a receptacle to contain a plurality of file units, a plurality of file units contained therein, each comprising a pocket to receive data slips and a flap cover for the mouth of said pocket, and a retaining member transfixing the cover flaps and pocket portions of succeeding file units preventing the removal of the units or opening of the flap covers while permitting to and fro movement of the units within the receptacle to expose different units of the plurality to view.

5. In a protected file, a receptacle to contain a plurality of file units, a plurality of file units each containing a pocket to receive data slips, the mouth of which is normally inaccessibly positioned within the receptacle, said units being perforated and a retaining member transfixing the perforated units to prevent their removal from the receptacle to afford access to the pockets thereof while permitting to and fro movement of the units within the receptacle to expose different units of the plurality to view.

6. In a protected file, a plurality of file pockets to receive data sheets and normally accessible for manual to and fro relative adjustment, means for retaining the file pockets interconnected one with another while permitting to and fro movement of the pockets to expose different pockets to view, and a closure means common to all the pockets of the series.

7. In a protected file, a series of file pockets to receive data slips or the like and normally accessible for manual adjustment relative to each other, means interconnecting the series of file pockets one with another while permitting the to and fro oscillatory movement thereof to expose different file pockets of the series to view, and a closure common to all the file pockets and overlapping the mouths thereof to normally prevent the insertion or removal of data slips.

8. In a protected file, a series of file pockets to receive data slips or the like normally accessible for manual adjustment relative to each other, and interconnected one with another for to and fro oscillatory movement to expose different pockets of the series to view and a closure common to all the file pockets extending transversely of the open mouths of the pockets and normally preventing the insertion or removal of data slips into or from said pockets, said pockets and closure being relatively movable to permit access to the pockets.

9. In a protected file, a series of file pockets to receive data sheets or the like and normally accessible for manual adjustment relative to each other, a barrier extending substantially parallel with the series of pockets and contiguous to the open mouths thereof, normally preventing the insertion or removal of data slips from said pockets, means for confining the pockets to juxtaposed relation to the barrier said pockets being movable to and fro relative to the barrier to present different pockets of the series to view.

10. In a protected file, a receptacle, a series of file units having transparent walled pockets to contain data sheets, said units being normally accessible for manual adjustment relative to each other, a barrier common to all the units extending contiguous to the access openings of the pockets, means for confining the units in juxtaposition to the barrier while permiting to and fro movement relative thereto to expose to view the data sheets contained in the transparent pockets of different units of the series, the units and barrier being relatively adjustable independently of the to and fro movement to permit access to the pockets.

11. In a protected file, a receptacle, a series of file units normally accessible for manual adjustment relative to each other each having a pocket opening laterally, the side wall of the receptacle being sufficiently high to overlap the mouth of the laterally opening pocket, and means for confining the units to the receptacle while permitting to and fro relative movement thereof to expose different units of the series to view.

12. In a protected file, an open top receptacle, a series of file units normally accessible for manual adjustment relative to each other, and arranged within the receptacle with the access openings of the pockets inaccessibly positioned thereby necessitating the removal of the units from the receptacle to enable the insertion or removal of data slips, and a locked retainer confining the units to the receptacle while permitting relative movement thereof to expose to view different units of the series.

13. In a protected file, a receptacle, a series of file units normally accessible for manual adjustment relative to each other, and having pockets therein for reception of data slips and the like, a closure flap on each unit overlying the access opening of the pocket, and a locked retainer maintaining the flaps in closed positions and interconnecting the units one with another while permitting relative movement thereof to expose different units of the series to view.

14. In a protected file, a receptacle, a series of file units having pockets therein for the reception of data slips and the like, a closure flap on each unit overlying the access opening of the pocket, and means for locking the flap in closed position while permitting relative movement of the units within the receptacle to expose different units of the series to view.

15. In a protected file, a receptacle, a file unit including a pocket, a closure flap therefor overlying the pocket and locked retaining means for securing the flap in closed position, and the unit against removal from the receptacle.

16. In a protected file, a plurality of file units normally accessible for manual adjustment relative to each other to expose to view any selected file unit of the plurality, each including a pocket to receive data slips and the like, and a closure flap for the pocket, a retainer common to the closure flaps of a plurality of file units for securing the flaps to prevent access to the pockets.

17. In a protected file, a plurality of file units each including a pocket to receive data slips and a closure flap therefor, and a locked rod transfixing the closure flaps of a plurality of units to prevent access to the pockets thereof.

18. As an article of manufacture, a file unit comprising a member having a pocket therein, and a closure flap foldable over the access opening of the pocket, said pocketed member and closure flap having registering perforations therein, to receive a retaining member insertable thru the perforations to prevent displacement of the unit or opening of the flap.

19. As an article of manufacture, a file unit comprising a length of material folded upon itself substantially to parallelism, a pocket upon the inner side of said folded member, the folded member having registering perforations in its free margins for the reception of a retaining member.

20. As an article of manufacture, a file unit, including a laterally opening pocket to receive data sheets or the like, said unit having therein a perforation below said pocket thru which to pass a retaining member.

21. As an article of manufacture, a file unit including a pocket, a transparent face wall for the pocket to expose to view the contents thereof, the access opening of said pocket being laterally disposed, whereby when said file unit is vertically disposed in a plane at substantially right angles to an independent lateral barrier member, such access opening of the pocket will be inaccessible, the unit being perforated adjacent to said pocket to receive a fastening means to temporarily restrain the removal of units from relation with the lateral barrier, with which it is associated when in use, substantially as specified.

22. As an article of manufacture, a file unit, comprising a section of material medially folded upon itself to form two substantially parallel flaps, a pocket located upon the inner side of one of the flaps with its access opening in juxtaposition to the fold of the section, and a second pocket upon the exterior of the other flap the access opening of the second pocket being laterally disposed.

23. As an article of manufacture, a file unit including a supporting member, a vertically opening pocket thereon, to receive data slips and the like, a laterally opening holder for a record sheet carried by the unit behind which the first mentioned pocket is located and a transparent cover for the record sheet.

24. In a protected file, a series of file units, each comprising a supporting member, a pocket on each unit, a record sheet holder on each unit, a transparent cover for the record sheet, a receptacle for said units, in which the units are confined in such a way that the pocket and holder are inaccessible while the unit is in said receptacle and a retainer normally preventing the removal of the units from the receptacle while permitting their relative movement therein to expose to view thru the overlying transparent covers the record sheets within the holders of different units.

25. A file unit, comprising a series of three interconnected pockets, including a normally accessible pocket for the deposit of sales slips and the like, a second pocket having a transparent wall for the display of a summary sheet, and a third pocket for the final deposit of slips transferred from the first pocket, and means for preventing access to the second and third pockets while permitting free access to said first pocket.

26. A file unit including a plurality of interconnected pockets opening in different directions, one of the pockets being normally accessible and means rendering the other pocket normally inaccessible for the removal of the contents.

27. A file unit comprising a series of three interconnected pockets one of which is upturned and easily accessible, means by which the other two of which have their access openings rendered normally inaccessible, and a receptacle in which a series of such file units are confined while permitting access thereto for relative manual adjustment to expose to view selected units of the series.

28. A file unit including two pockets having their access openings turned in different directions, and means for rendering one of the pockets normally inaccessible while permitting ready access to the other of said pockets, substantially as specified.

29. A file unit including a plurality of interconnected pockets having their access openings turned in different directions, and a receptacle for a series of such file units in which the units are relatively movable, one of the pockets of each file unit being normally accessible, said file units being so arranged as to prevent access to the remaining pockets of each unit substantially as specified.

30. A file unit including a normally accessible pocket for the temporary reception of current data slips, and a second pocket for the storage of data slips transferred from the first pocket, a holder for a series of such units and means for locking the units to the holder and thereby rendering the second pocket normally inaccessible while permitting access to the first mentioned pocket.

31. In a protected file, a series of file units normally accessible for manual adjustment relative one to the other to expose to view selected units of the series, said units having therein pockets to contain data sheets, a barrier common to all the units preventing access to said pockets, means for confining the units in juxtaposition to the barrier while permitting to and fro movement relative thereto, the units and barrier being relatively adjustable independently of the to and fro movement, to permit access to said pockets.

32. In a protected file, a receptacle, a file unit movably secured therein, including a pocket, a closure flap overlying the pocket, a second exposed pocket, also upon said unit, and retaining means for securing the flap in closed position, said units being capable of to and fro movement to permit access to the exposed pocket.

33. In a protected file, a receptacle to contain a plurality of file units, a plurality of file units each containing a pocket to receive data sheets, the mouth of which is normally inaccessibly positioned, while the units are retained within the receptacle, and a retaining member normally preventing the removal of the units from the receptacle, while permitting to and fro movement therein.

34. As an article of manufacture, a file unit comprising a section of material folded upon itself to form two substantially parallel flaps with the interconnecting fold turned uppermost, a pocket upon the inner side of one of the flaps with its access opening turned toward the fold of the section, and a second pocket having an access opening upon the exterior of one of said flaps also upturned toward the fold of the section.

35. In a protected file, a receptacle to contain file units, a plurality of file units therein, each unit including both normally accessible and inaccessible pockets for insertion of data sheets, means for confining the file units to the receptacle in such relation that the access openings of a part of the pockets are inaccessibly positioned while permitting to and fro oscillation of the file units within the receptacle to enable free access to the remaining normally accessible pockets.

36. In a protected file, a receptacle to contain a plurality of file units, a plurality of file units therein, each embodying a plurality of pockets to receive data sheets, said units being so positioned within the receptacle that a portion of the pockets are normally accessible and a portion thereof are normally inaccessibly positioned within the receptacle, and retaining means for engaging the units with the receptacle to normally prevent their removal therefrom to afford access to the normally inaccessible pockets while permitting to and fro oscillation of the units to facilitate the insertion of data slips in the accessible pockets.

37. In a protected file, a receptacle, a series of file units having a plurality of pockets to contain data sheets, a barrier common to all the units, extending contiguous to the access openings of a pocket of each unit, means for confining the unit in juxtaposition to the barrier to confine the contents of such pockets, while permitting to and fro movement of the units to enable access to another pocket of each unit, the units and barrier being relatively adjustable independently of the to and fro movement, and means for locking and releasing the barrier and units in to and fro operative relation with each other.

38. In a protected file, a receptacle, a file unit including a pair of pockets, a closure flap overlying one of the pockets, and locked retaining means common to a plurality of such units for securing each unit within the receptacle with its flap in closed position, while exposing the other pocket for ready access.

39. As an article of manufacture, a file unit including a plurality of pockets, one of which is normally accessible and another of which is normally inaccessible, closure means for the inaccessible pockets of such units, and lock means common to a plurality of such units for preventing access thereto while permitting to and fro movement of the units to afford access to the normally accessible pockets.

40. In a protected file, a series of file units, a holder therefor in which the units are manually adjustable to expose to view, selected units of the series, each unit including a plurality of pockets to receive data sheets, means rendering a part of the pockets of each unit inaccessible while the unit is in said holder, and retaining means normally preventing the removal of the units from the holder while permitting their relative movement, to permit access to other pockets of said units.

In testimony whereof, I have hereunto set my hand this 10th day of October, A. D. 1924.

FRED M. SHOTWELL.